Oct. 13, 1959  R. O. PETERSON  2,908,116
ROTARY TOOL ASSEMBLY
Filed Sept. 17, 1954  7 Sheets-Sheet 1

INVENTOR.
RUBEN O. PETERSON
BY
Oberlin + Limbach
ATTORNEYS.

United States Patent Office 2,908,116
Patented Oct. 13, 1959

2,908,116

ROTARY TOOL ASSEMBLY

Ruben O. Peterson, University Heights, Ohio, assignor to The Osborn Manufacturing Company, Cleveland, Ohio, a corporation of Ohio Application September 17, 1954, Serial No. 456,846

33 Claims. (Cl. 51—193)

This invention relates as indicated to a rotary tool assembly, and more particularly to a rotary brushing or buffing tool utilizing individual buffing elements arranged and secured to a rotatable support or hub in a novel manner to obtain improved action on the work in use and to afford a more efficient long-lived tool.

Sheet material, and especially textile fabric and the like, has long been assembled in various ways to form rotary buffs commonly employed in surface-finishing and polishing a variety of work-pieces. It is the usual practice to apply granular abrasive materials to the outer working periphery of the buff to enhance the action of the latter, and it has also been proposed to incorporate abrasive material in the buff itself in various ways. Certain abrasive cloths are available which may be folded into fingers of various shapes and secured to a hub or brush back. It is found, however, that such cloth fingers tend to buckle where thus secured to the hub or back and also spread badly. By forming folded fingers of abrasive sheet material of general conical form and securing the pointed ends of such fingers to the support, it is possible to provide rotary buffing tools having relatively dense outer working peripheries. The abrasive on the cloth, however, usually makes sewing and like operations impractical, and a serious problem has been encountered in mounting such abrasive buffing fingers in a satisfactory manner.

It is accordingly a principal object of my invention to provide a rotary buffing tool having a plurality of sheet material fingers extending therefrom, ordinarily with granular abrasive bonded thereto or otherwise rendered abrasive in character, and in which such buffing fingers are securely held and positioned.

Another object is to provide such buffing tool wherein the action on the work-piece will be exceptionally uniform and streaking and local over-buffing will be avoided.

Other objects of the invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

Fig. 28 shows clamping means for gripping the tapering buffing fingers;

Fig. 34 corresponds to Fig. 33 but shows the two hub discs of Figs. 25-27 indexed to stagger the opposed fingers.

Referring now more particularly to Figs. 1–12 inclusive of the drawing, in the embodiment of my invention there illustrated a plurality of radially extending tapered buffing elements 1 are mounted in a central rotatable support or hub comprising a pair of opposed annular sheet metal stampings 2 and 3. Such stampings have similar inner cylindrical portions 4 and 5 respectively and annular land portions surrounding the same. A plurality of opposed openings are punched through the flats of the stampings circumferentially of such lands with the protruding lips 6 surrounding such openings in one such member passnig through the corresponding openings in the other such member and being upset to rivet the same together.

Figure 2:
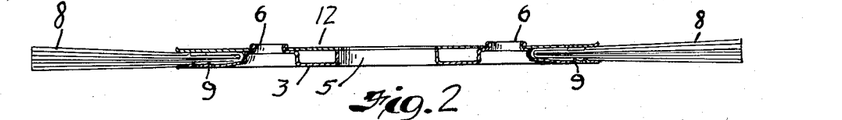
Fig. 2 is a diametrical cross-section taken on the line 2—2 on Fig. 1.
Figure 3:
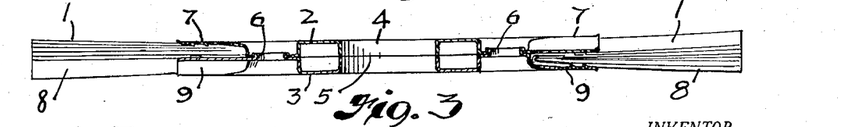
Fig. 3 is a transverse sectional view taken on the line 3—3 on Fig. 1 and showing two of my new annular buffing elements assembled together into a single unit.

The buffing fingers 1 are secured in radially disposed tapering sockets or recesses 7 in stamping 2 and fingers 8 in similarly circumferentially disposed recesses or sockets 9 in stamping 3 (Fig. 3). Fig. 2 illustrates a modification utilizing but one of the above-described stampings, as will be explained below.

As best shown in Figs. 5–12 inclusive, such sockets or recesses taper inwardly from the outer periphery of the respective stampings and are provided with a number of small sharp teeth such as 10 struck up from the metal of the stamping and projecting generally radially inwardly thereof. Tongues 11 are turned up from the metal between such sockets and flange over to clamp the tapering buffing fingers 7 and 8 firmly against the teeth 10. A strong adhesive will also desirably be applied to the buffing fingers on the sides toward the socket further to assist in holding such fingers in place.

Figure 1:
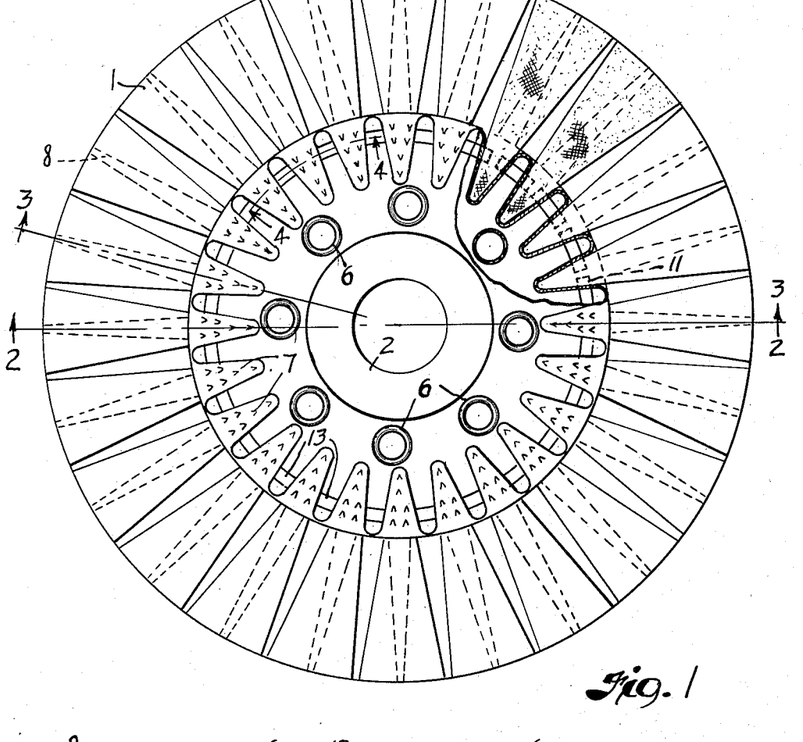
Fig. 1 is an end view of an annular rotary buffing tool embodying the principles of my invention.
Figure 4:
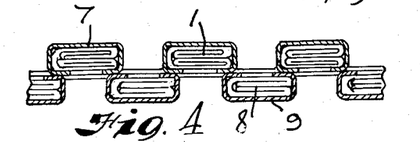
Fig. 4 is a fragmentary sectional view taken on the line 4—4 on Fig. 1.
Figures 5, 6, 7, 8, 9, 10, 11, 12:
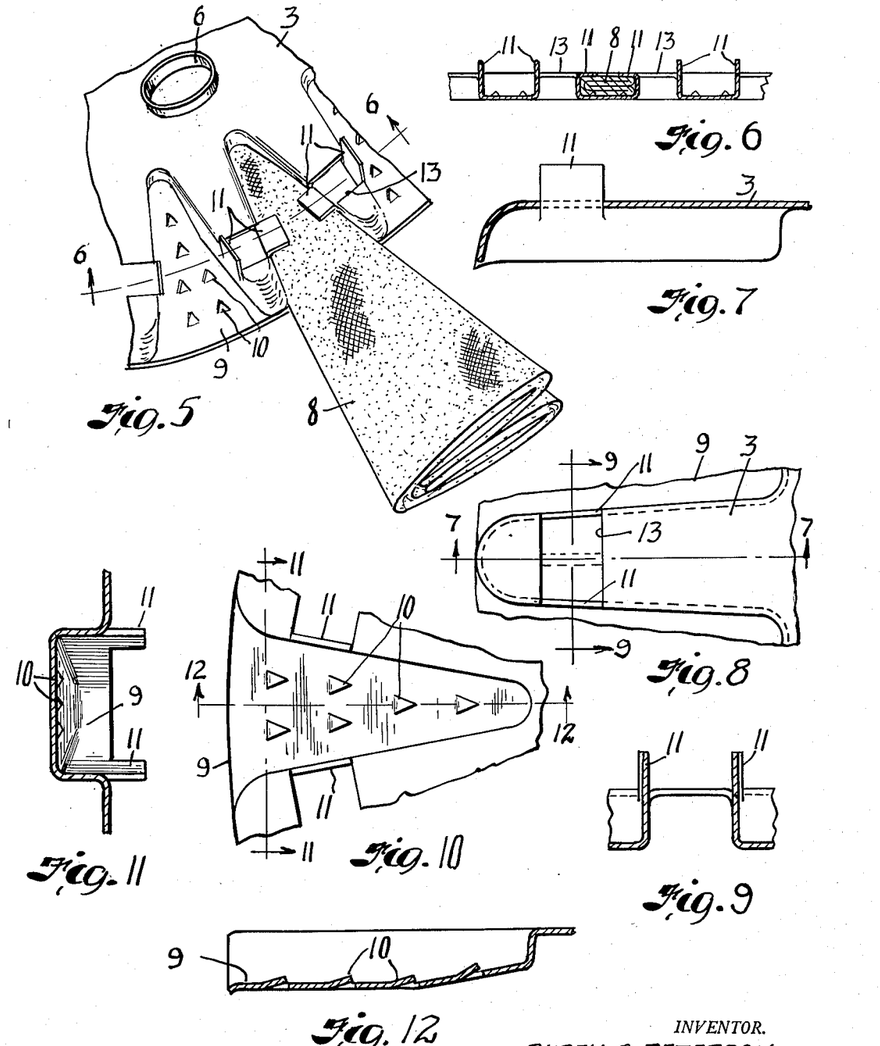
Fig. 5 is a fragmentary detail view of a portion of the periphery of one of my rotary buffing elements illustrating the manner in which the buffing fingers are secured thereto.
Fig. 6 is a fragmentary sectional view taken on the line 6—6 on Fig. 5.
Fig. 7 is a fragmentary radial sectional view taken on the line 7—7 on Fig. 8.
Fig. 8 is a fragmentary plan view of one of the raised lands intermediate the finger-receiving recesses or sockets.
Fig. 9 is a transverse section taken on the line 9—9 on Fig. 8.
Fig. 10 is a plan view of one of such finger-receiving recesses or sockets.
Fig. 11 is a transverse section taken on the line 11—11 on Fig. 10.
Fig. 12 is a radial section taken on the line 12—12 on Fig. 10.

As best shown in Figs. 1 and 4, the two opposed identical stampings 2 and 3 are rotated relative to one another a distance equal to one-half the width of a buffing finger before such stampings are riveted together. As a consequence, the fingers 1 are circumferentially offset relative to fingers 8 to afford an arrangement wherein such fingers mutually support one another and provide an outer peripheral working surface less likely to streak the work in use. This is particularly true when a number of the buff assemblies are mounted in close side-by-side relationship upon an arbor or mandrel to form a cylindrical buff of considerable axial extent. As best shown in Fig. 3, each stamping furthermore bears against the buff material in the sockets of the adjacent stamping further to assist in retaining such material in place. When but a single such stamping is utilized as in Fig. 2, a flat annular sheet metal disc 12 is riveted to the side of the stamping in the same manner and performs a similar function.

The circumferentially disposed openings afforded by the upset tubular projection 6 serve the purpose of passing ventilating air and it is desirable that such openings be substantially radially spaced from the central arbor hole in order to afford maximum clamping action and to deliver the ventilating air as close to the inner ends of the buffing fingers as practical. Of course, spot welding or stapling may be utilized in addition to or instead of such tubular rivets for joining the opposed hub stampings together. The openings 13 formed as a result of striking up the tabs 11 also afford additional ventilation adjacent the outer periphery of the hub.

A convenient method of manufacture is to deliver the folded tufts or fingers to an assembly table where a hub stamping is placed on a vertical arbor with the recesses such as 9 (see Fig. 5) opening upwardly. Adhesive may be applied in such recesses or to the tuft ends and a tuft then placed in each recess. A flaring tool may then be brought down to flare the clamping projections 11 and bend them down over the tufts, the resultant assembly of tufts and hub stamping being sufficiently well secured together to permit further handling as a unit. Two such hub stampings, one with the tubular rivet projection 6 and the other with slightly larger holes, are placed together on an assembly die and the ends of the projection 6 upset to secure the stampings together. The resultant pairs of stampings joined together and each bearing a full complement of tufts may then be stacked on arbors and heat applied to the metal portions to cure the adhesive.

While the barbs 10 have been found effective to withstand a very substantial outward pull on the buffing fingers even without the supplemental employment of adhesive, such adhesive nevertheless affords greater security and the assurance that vibration in use will not tend to cause such barbs to work holes in the surface of the fabric fingers.

The fabric fingers will preferably be folded so that the inner pointed ends are not as thick as the outer portions, thereby permitting the recesses 9 to be only about one-half as deep at their pointed inner ends as at the outer periphery of the stamping.

Figure 15:
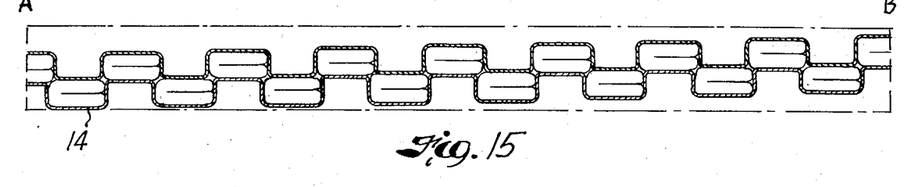
Figs. 15, 16 and 17 are developed sectional views through the finger-receiving sockets of the central rotatable support circumferentially of the latter, showing the progressive lateral displacement of the same.
Figure 16:
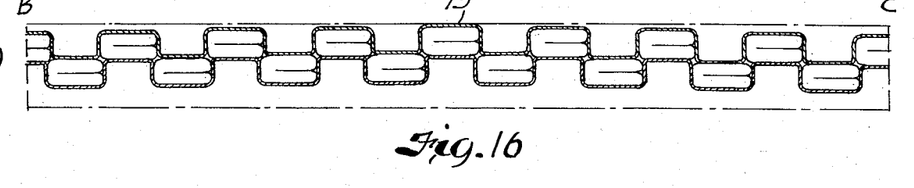
Figure 17:
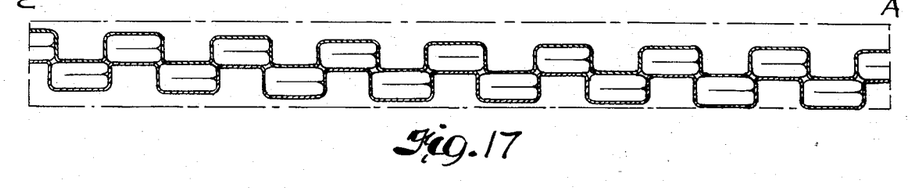

Referring now more particularly to Figs. 13–19 inclusive of the drawing, the embodiment of my invention there illustrated comprises a brushing tool wherein each stamping is provided with 24 tuft pockets which may be divided into four groups of six each. As shown in Figs. 15–17 inclusive (which are similar to Fig. 4), it will be seen that the stampings are slightly deformed so that diametrically opposite pockets 14 and 15 will be axially displaced to the maximum extent, the intervening pockets being each progressively displaced a small uniform increment (for example, about .02 inch), this being achieved by tilting each pocket or recess an additional degree. As a consequence, the series of pockets is so displaced that they do not lie in a single plane normal to the axis of the tool, except for the two pockets midway between pockets 14 and 15. This arrangement is very beneficial in preventing streaking of the work in use and it will be appreciated that other arrangements of the pockets may be employed which likewise prevent the same from extending in the same radial plane.

Figure 13:
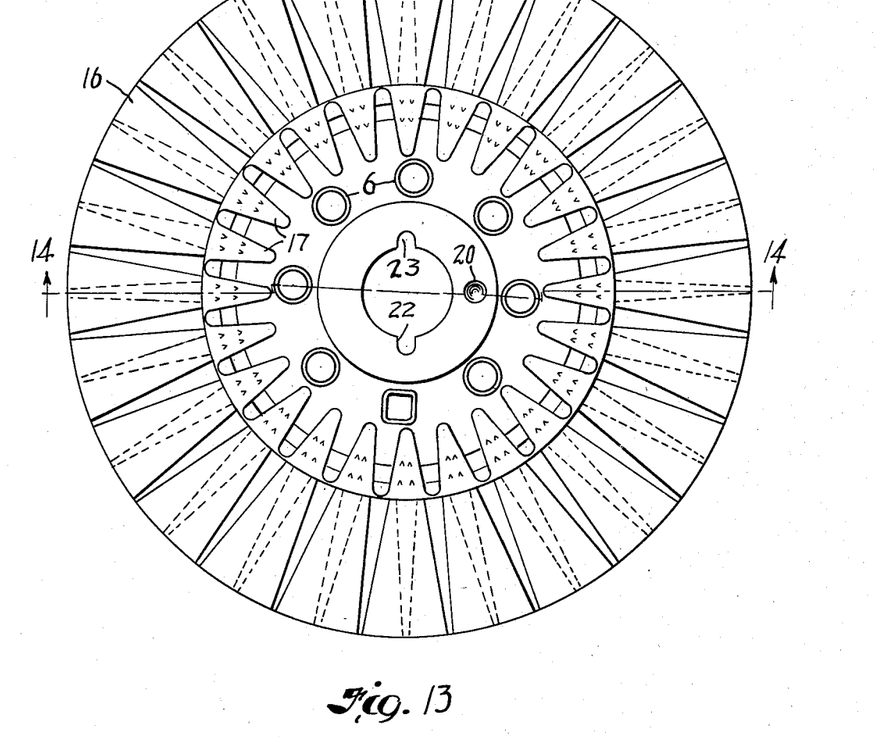
Fig. 13 is an end view of another rotary tool embodying the principles of my invention.
Figure 14:
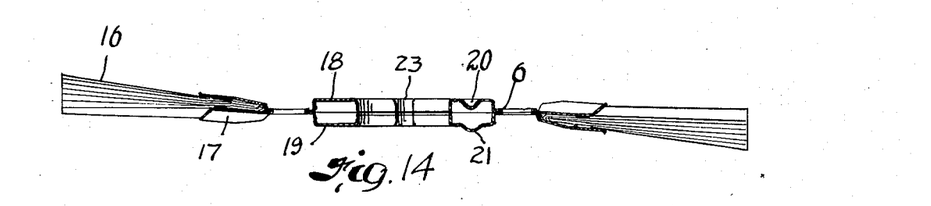
Fig. 14 is a diametrical transverse section taken on the line 14—14 on Fig. 13.

In the Fig. 13 embodiment, the buffing fingers 16 are retained in the sockets or pockets 17 in the same manner previously described and the two stampings 18 and 19 may likewise be joined together by tubular rivet 6 in the same fashion. Stamping 18 is formed with an indentation 20 corresponding to a similar protuberance 21 on stamping 19 so that when a number of the rotary sections are axially assembled together to form a cylindrical brushing tool of considerable axial extent, each such section may be properly oriented relative to the other, bearing in mind the manner in which the finger-carrying pockets are offset as above described. Keyways 22 and 23 may also be provided to assist in driving the tool when mounted upon an appropriate arbor. Such keyways additionally assist in the proper orientation of the respective sections.

Figure 18:
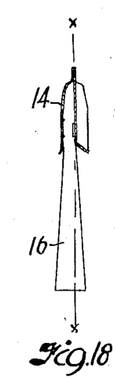
Figs. 18 and 19 are transverse fragmentary sections radially of the tool of Fig. 13 illustrating lateral displacement of the buffing fingers.
Figure 19:
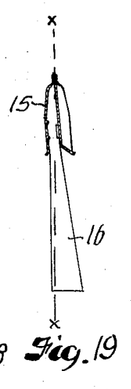

In fragmentary Figs. 18 and 19, individual buffing fingers are shown extending from pockets 14 and 15 respectively, the dash lines X—X representing the median plane from which such fingers deviate as above indicated.

The radially extending tufts or fingers may, for example, be formed in the manner taught in my co-pending application Serial No. 308,242 and such fingers may be of various textile fabrics or imperforate plastic sheet materials. Thus cotton cloth, nylon (polyamide resins), Pliofilm (rubber hydrochloride), and certain types of paper sheet material are suitable for use in various embodiments of my invention, and other natural or manufactured fiber materials may likewise be employed. Pie-shaped segments of felt may be stapled together to form the fingers.

Granular abrasives which may be adhered to such sheet materials include: aluminum oxides such as Alundum and Aloxite, silicon carbide (Carborundum), chrome oxide, precipitated aluminum oxide, emery, rouge, pumice, tripoli, sharp sand, bauxite and diatomaceous earth. Fabric may also be woven of abrasive strands of the type disclosed in Radford Patent 2,328,998, for example. While my novel tool construction is particularly advantageous when employing abrasive sheet material fingers, it is also useful with plain fabric fingers, especially when the latter are of relatively stiff materials.

While many types of adhesives may be employed to bond the abrasive to the fabric, depending on the particular application, the following may be mentioned: animal glues, glycerol phthalate resins such as "Dulux," Bakelite resins, cellulose base resins, casein glue, and even waxes such as cerotic acid wax and greases such as mutton tallow. Ordinarily adhesives are preferred which have relatively little stiffening effect on the fabric and do not tend to smear the work, or at least may be readily removed from such work.

The central rotatable support or hub will ordinarily be formed of sheet metal (e.g. steel or brass) stampings but vulcanized fiber is likewise sometimes suitable.

It will be seen that I have provided a novel rotary tool having abrading and polishing fingers arranged with the bulk of the adhesive and polishing material adjacent its outer working periphery, such fingers being firmly held, seated and oriented, and arranged for ventilation by the outward flow of cooling air in use. In contrast to conventional belt sanders, my new tool (which may comprise an axial assembly of a large number of units) will perform a uniform operation on the work-piece despite minor local damage to the working face thereof.

Referring now more particularly to Figs. 20-24 inclusive of the drawing, the embodiment of the invention there illustrated comprises an annular sheet metal disc or hub member 24 having a plurality of ventilating apertures 25 therein and a central opening for mounting upon an arbor 26. Teeth 27 are struck up from the outer periphery of the disc and another set of teeth 28 are struck up from the disc in a circumferential region spaced somewhat radially inwardly from the outer periphery of the disc. Such teeth are adapted to be flanged over toward each other to embrace and grip a sheet metal ring or annulus 29 (see Fig. 20).

Figure 20:
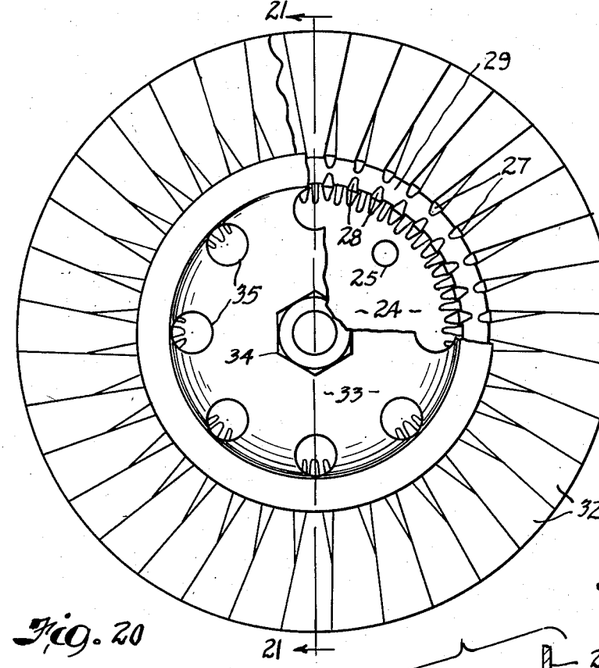
Fig. 20 is an end view of another embodiment of my invention, with a portion broken away to show the internal construction thereof.
Figure 21:
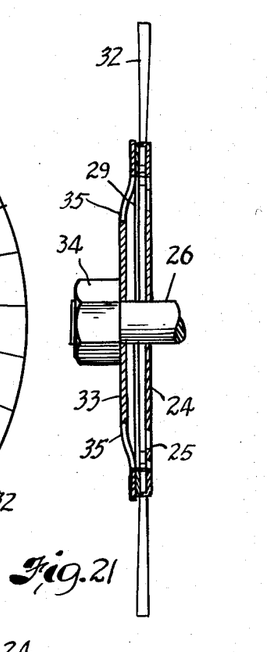
Fig. 21 is a diametric section taken on the line 21—21 on Fig. 20.
Figure 22:
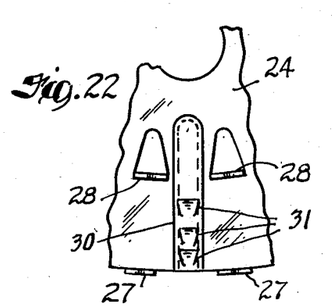
Fig. 22 is a fragmentary enlarged view of buffing finger retaining means.
Figure 23:
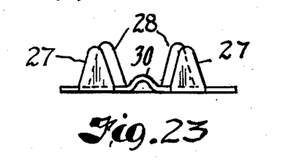
Fig. 23 is a view corresponding to Fig. 22 taken radially inwardly from the outer periphery of the hub element.
Figure 24:
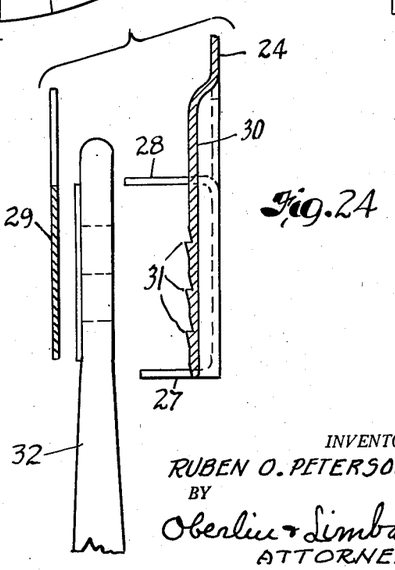
Fig. 24 illustrates the manner of assembly of the buffing finger retaining elements.
Figure 25:
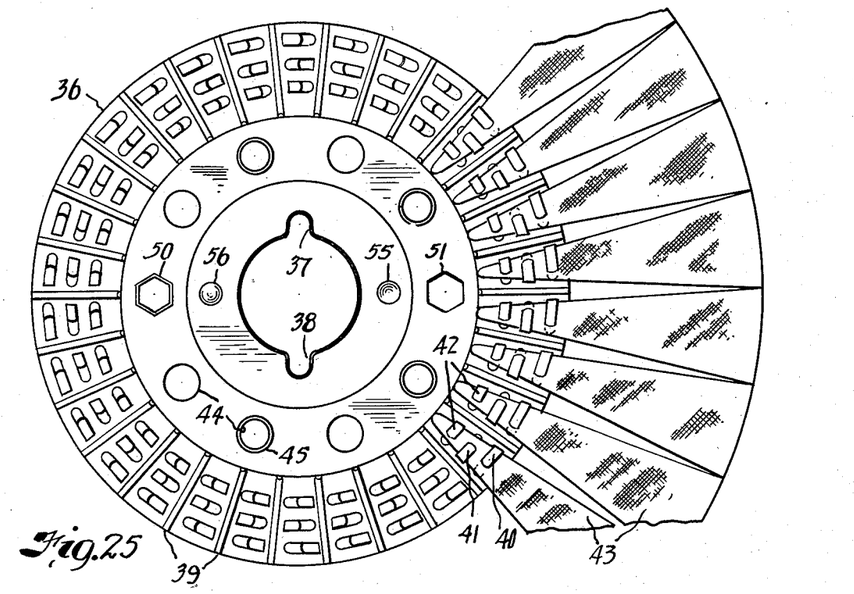
Fig. 25 shows a hub disc with buffing fingers secured thereto in accordance with my invention.
Figure 26:
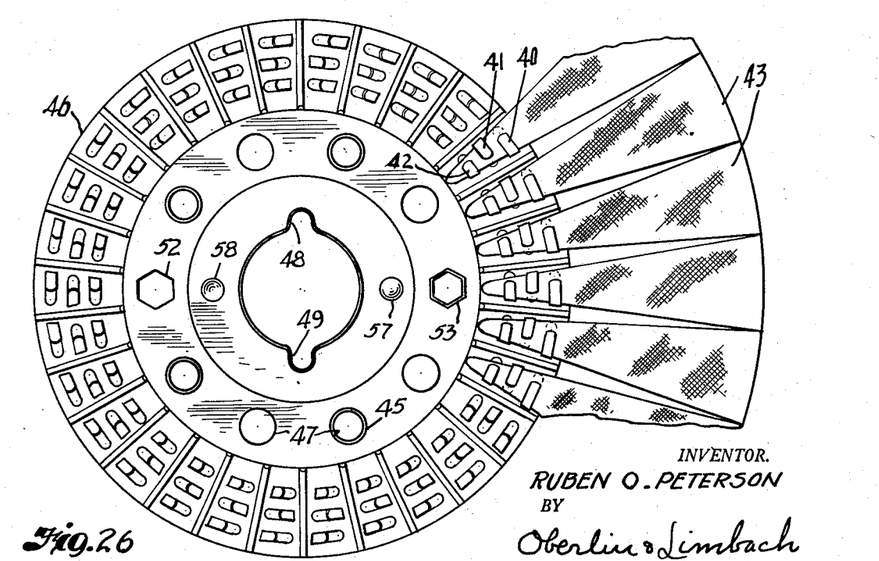
Fig. 26 shows an assembly similar to that of Fig. 25 but indexed 180° to be opposed and riveted thereto.

Adjacent the periphery of the disc are a plurality of radially extending raised or embossed regions 30 having low teeth 31 struck up from the raised surface to assist in gripping the inner tapered ends of the buffing elements or fingers 32. Such inner pointed ends of the folded fabric buffing elements 32 are held tightly clamped against such teeth 31 by means of annulus 29 in turn firmly gripped by the rows of opposed teeth 27 and 28 on the supporting disc. The mode of assembly of these component parts is best shown in semi-diagrammatic Fig. 24. A plurality of the buffing sections thus produced may be assembled on a spindle or arbor 26 and clamped together to form a cylindrical or roller buff by means of sheet metal end plates such as 33 slightly dished resiliently to bear against the outer peripheral portions of the endmost sections only. Such end plates may be retained in place by means of nuts such as 34 threaded on the end of the arbor and may desirably be provided with ventilating apertures such as 35 so that air may flow inwardly through such latter apertures and apertures 25 in the hub discs to escape radially between adjacent sections under the action of centrifugal force when the rotary buffing tool is driven at high speed in use.

Figure 27:
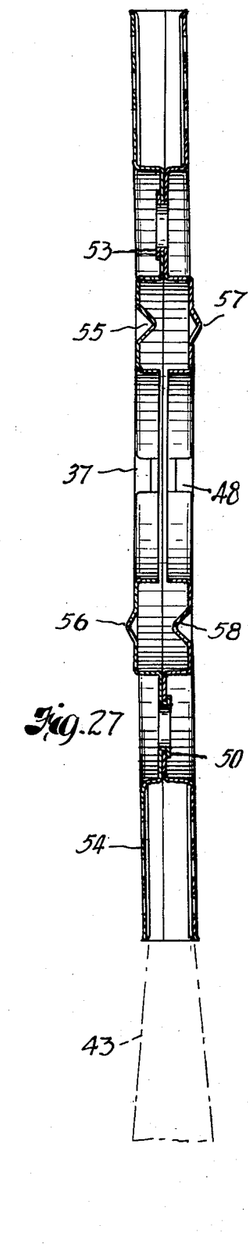
Fig. 27 is a diametric section through two such assemblies thus riveted together.
Figure 29:
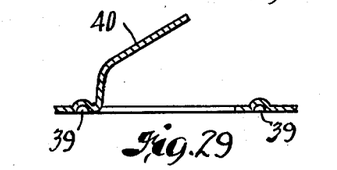
Fig. 29 is a section taken on the line 29—29 on Fig. 28.
Figure 30:
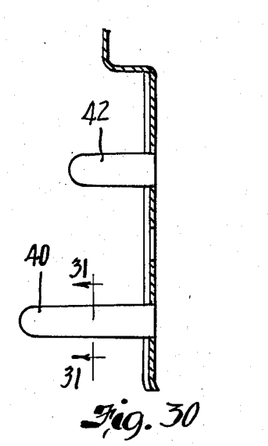
Fig. 30 is a section taken on the line 30—30 on Fig. 28.
Figure 31:
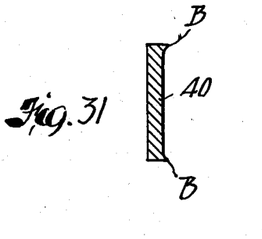
Fig. 31 is a section taken on the line 31—31 on Fig. 30.
Figure 32:
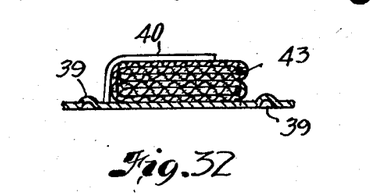
Fig. 32 is a section through a clamped buffing finger taken on the periphery of a hub disc as on line 32—32 on Fig. 28.

Reference may now be had to Figs. 25-34 inclusive of the drawing illustrating yet another preferred embodiment of my invention. In the construction illustrated, an annular sheet metal disc 36 may be provided with inner keyways 37 and 38 similarly to the hub element of Fig. 13 for controlled indexing of such hub on the spindle or arbor on which it is mounted. Disc 36 has a large number of radially extending grooves 39 formed therein which serve the dual function of facilitating outward flow of ventilating air in use and also of rigidifying the sheet metal disc or hub member. Three radially spaced circumferential rows of teeth 40, 41 and 42 are struck up from the disc intermediate such grooves, the teeth all projecting to the same side of the disc on which grooves 39 project as low radial ridges. The tapering buffing fingers 43 of the same general type previously described are clamped and held by such teeth 40, 41 and 42. It is ordinarily desirable to employ adhesive on the narrow inner end portions of the buffing fingers gripped by such teeth, and it will be appreciated that the burs B on the edges of the holes and teeth or tabs 40, 41 and 42 will assist in firmly gripping the buffing fingers. Ventilating openings such as 44 are provided in the disc 36, and certain of such openings may have upturned rims or edges such as 45 to facilitate the riveting of adjacent pairs of discs together as best shown in Fig. 27.

When thus joining two discs together to form a single unitary buffing section, the second disc 46 (Fig. 26) may be identical to disc 36 but indexed to ensure that the radially extending buffing fingers of one such disc are staggered relative to the fingers of the other disc. This result may be achieved by indexing the location of openings 47 and keyways 48 and 49 174° in the embodiments illustrated rather than a full 180° to oppose the rims 45 to unrimmed apertures 44 for riveting together. Proper indexing may be assured by the provision of non-circular openings such as 50, 51, 52 and 53 which are adapted to be thus riveted together when the discs are properly indexed.

The two discs will be thus joined together as best shown in Fig. 27 with the buffing fingers of the two elements opposed to each other and the outer peripheral portions of the two discs together forming a radially outwardly opening peripheral channel 54 enclosing the inner ends of the buffing fingers. While the annular regions including the apertures 44, 47, and 50-53 are laterally offset toward each other to facilitate joining of the two discs as shown, the inner hub portions together provide a relatively rigid inner annular box-like structure for mounting on an arbor or like support. Dimples 55, 56, 57 and 58 formed in such inner hub portion serve properly to index adjoining buffing sections when mounted on an arbor so that alternate rows of buffing fingers will be staggered relative to one another throughout the length of the buff, and such dimples also serve as a means of interlocking the sections for rotation as a unit.

Figure 33:
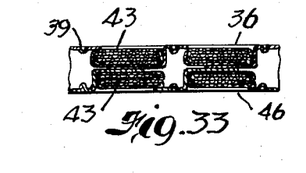
Fig. 33 is a section generally similar to Fig. 4 but showing the assembly of Fig. 27 with the two circumferential sets of fingers directly opposed.

The above-described staggered relationship of the buffing fingers 43 in a single section is shown in Fig. 34, but it will be equally apparent that the two opposed discs comprising such section may, if desired, be indexed so that adjacent buffing fingers 43 are directly side-by-side (Fig. 33).

The opposed discs comprising a buffing section may, if desired, be welded together instead of riveted, apertures however being provided therethrough nevertheless in order to facilitate ventilation. When welding is thus employed, the two discs may be of exactly identical conformation since one disc may then be indexed relative to the other to obtain the desired staggered relationship of the buffing fingers without the necessity of providing correspondingly indexed rivet means.

Inasmuch as the stamped discs 36 and 46 are slightly deformed similarly to those of Figs. 15-19 (see Fig. 27), it is apparent that the outer tuft or finger-bearing portion of the assembled section is not precisely normal to the axis of rotation, and this is another reason for providing means such as dimples 55-58 for properly indexing adjacent sections. In a typical example, the outer peripheral flange portion of a disc may be offset $\frac{1}{16}$ of an inch at one point and $\frac{1}{16}$ of an inch in the opposite direction at a diametrically opposite point (these being the maximum outwardly displaced portions), and such offset will cause the alignment of tufts borne by the disc to oscillate axially of each revolution of the buff about $\frac{1}{8}$ of an inch, which may be approximately half the thickness of the tufts or fingers carried by the disc. As previously explained, this arrangement assists in eliminating streaking of the work which might otherwise occur were each succeeding tuft of a circumferential alignment to follow in the exact path of the preceding tuft as the buff turns. While the construction described is particularly suitable for rotary tools utilizing relatively stiff abrasive-bearing folded fabric fingers or tufts, it will be appreciated that such construction may also be utilized with various other types of buffing or brushing materials including plain textile fabric fingers and the like.

This application is a continuation-in-part of my co-pending application Serial No. 308,242 filed September 6, 1952, which issued as Patent No. 2,755,608, dated July 24, 1956.

Other modes of appying the principle of the invention may be employed, change being made as regards the details described, provided the features stated in any of the following claims or the equivalent of such be employed.

I therefore particularly point out and distinctly claim as my invention:

1. A rotary buffing tool comprising two annular sheet metal stampings having a plurality of separate radially disposed outwardly flaring recesses formed in their outer peripheries, teeth struck up from the bottoms of said recesses projecting generally radially inwardly, generally triangular folded fabric buffing fingers of abrasive coated sheet material having narrow pointed inner end portions fitted in said recesses and engaged by said teeth with their wider end portions forming the outer working face of the tool, adhesive in said recesses bonding said fingers therein, and tabs struck up from said stampings intermediate said recesses and flanged over against said fingers to hold the latter in place against said teeth, the recessed faces of said two stampings bearing said fingers being directly opposed in face-to-face contact and closely secured together with the recesses and fingers of one said stamping staggered relative to those of the other said stamping, with aligned ventilating openings through said stampings intermediate said fingers and the central openings therein.

2. A rotary buffing tool comprising two annular sheet metal stampings having a plurality of separate radially disposed outwardly flaring recesses formed in their outer peripheries, teeth struck up from the bottoms of said recesses projecting generally radially inwardly, generally triangular folded fabric buffing fingers of abrasive coated sheet material having narrow pointed inner end portions fitted in said recesses and engaged by said teeth with their wider end portions forming the outer working face of the tool, adhesive in said recesses bonding said fingers therein, and tabs struck up from said stampings intermediate said recesses and flanged over against said fingers to hold the latter in place against said teeth, the recessed faces of said two stampings bearing said fingers being directly opposed in face-to-face contact and closely secured together with the recesses and fingers of one said stamping staggered relative to those of the other said stamping.

3. A rotary buffing tool comprising two annular sheet metal stampings having a plurality of separate radially disposed outwardly flaring recesses formed in their outer peripheries, teeth struck up from the bottoms of said recesses projecting generally radially inwardly, generally triangular buffing fingers having narrow inner end portions fitted in said recesses and engaged by said teeth with their wider end portions forming the outer working face of the tool, and adhesive in said recesses bonding said fingers therein, the recessed faces of said two stampings bearing said fingers being directly opposed in face-to-face contact and closely secured together with the recesses and fingers of one said stamping staggered relative to those of the other said stamping.

4. A rotary tool comprising two annular hub members having a plurality of separate radially disposed outwardly flaring recesses formed in the outer peripheral portions of their end faces, and individual generally triangular buffing fingers having narrow inner end portions conforming to and secured in each of said flaring recesses with their wider end portions forming the outer working face of the tool, the recessed faces of said hub members bearing said fingers being directly opposed in face-to-face contact with the recesses and fingers of one said member being circumferentially staggered relative to those of the other said member to assist in supporting said fingers in said recesses and to afford a more uniform working face.

5. A rotary tool comprising two annular hub members having a plurality of separate radially disposed recesses formed in the outer peripheral portions of their end faces, and working fingers secured in said recesses and extending radially therefrom, the recessed faces of said hub members bearing said fingers being held directly opposed in face-to-face contact to assist in supporting the latter.

6. A rotary tool comprising an annular disc shaped sheet metal stamping having a plurality of radially disposed outwardly flaring recesses formed in the outer peripheral portion of one face thereof, teeth struck up from the bottoms of said recesses, generally triangular folded fabric buffing fingers of abrasive coated sheet material having narrow pointed inner end portions fitted in said recesses and engaged by said teeth with their wider end portions forming the outer working face of the tool, adhesive in said recesses bonding said fingers therein, tabs struck up from said stamping and bent on generally radial lines over against said fingers to assist in holding the latter against said teeth, and a flat annular disc secured closely to the side of said stamping having said recesses and fingers adapted to engage and support the latter.

7. A rotary tool comprising a thin annular disc shaped sheet material hub having radially extending outwardly flaring recesses formed in its outer periphery, tapering sheet material fingers having their narrow end portions inserted and secured in such recesses and their wide end portions extending radially therefrom to form the working face of the tool, and a generally flat annular disc secured closely to the side of said hub having such recesses and said fingers to support the latter.

8. A rotary tool comprising an annular rotatable hub having a plurality of separate, circumferentially spaced radially extending outwardly flaring recesses in its outer periphery, tapering working fingers having their narrow end portions inserted and secured in such recesses conforming to the flaring sides thereof and their wide end portions extending radially therefrom to form the working face of the tool.

9. The tool of claim 8 wherein adhesive bonds said fingers to said hub in such recesses.

10. A rotary tool comprising two annular hub members having a plurality of separate radially disposed recesses having outwardly flaring sides formed in the outer peripheral portions of their end faces, and working fingers secured in said recesses and extending radially therefrom, the recessed faces of said hub members bearing said fingers being held directly opposed to assist in supporting the latter, and circumferentially successively said recesses being slightly offset axially of said tool so that successive fingers do not exactly follow one another circumferentially of said tool in a plane normal to the tool axis.

11. A rotary tool comprising a rotatable hub and brush material extending generally radially therefrom, said brush material being progressively circumferentially slightly displaced from a plane normal to the axis of said tool, the material on one side of a diametrical line being thus displaced in one direction and the remainder in the other direction.

12. A rotary buffing tool comprising an annular sheet metal stamping adapted to be mounted on an arbor or the like having a plurality of radially extending embossed serrated regions adjacent its outer periphery, clamping tabs turned up from such periphery of said stamping intermediate such regions, other clamping tabs punched up from said stamping spaced radially inwardly of said first tabs, inwardly tapering radially extending fabric fingers having their narrow inner end portions laterally engaging said serrated regions, and a flat sheet metal annulus engaging the other sides of said finger end portions and firmly clamped thereagainst by said two sets of tabs flanged over the inner and outer peripheral edges thereof respectively, said fingers being additionally secured by adhesive applied to said clamped inner end portions.

13. A rotary buffing tool in accordance with claim 12 wherein said fingers are coated with granular abrasive bonded thereto.

14. A rotary tool comprising a disc shaped hub member having a plurality of radially extending serrated regions adjacent its outer periphery, circumferentially spaced clamping tabs turned up from such periphery of said hub, other clamping tabs projecting from the same side of said hub spaced radially inwardly of said first tabs, inwardly tapering radially extending buffing fingers having their narrow inner end portions laterally engaging said serrated regions intermediate said tabs, and an annulus engaging the other sides of said finger end portions and firmly clamped thereagainst by said two sets of tabs.

15. A rotary tool comprising a disc shaped hub member having a plurality of radially extending serrated regions adjacent its outer periphery, radially extending buffing fingers having their inner end portions laterally engaging said serrated regions, an annulus engaging the other sides of said finger end portions, and means firmly securing said annulus to said hub.

16. A rotary buffing tool comprising an assemblage of aligned sheet metal discs mounted upon an arbor, two radially spaced rows of circumferentially arranged teeth turned up from each said disc, a flat rigid sheet material annulus fitting between said two rows of teeth of each disc and embraced and clamped thereby, a strip of sheet material interposed and firmly held between each said disc and annulus, a plurality of tapering sheet material buffing fingers secured at their narrow ends to each said strip and extending radially outwardly from each said disc, the wide outer ends of circumferentially adjacent fingers overlapping, radially extending ridges formed in said discs extending to the outer peripheries of the latter intermediate said teeth, serrations on said ridges adapted to engage and help secure said strip, said ridges forming corresponding radial grooves in the opposite faces of said discs effective to enhance radially outward flow of ventilating air, and clamping means adapted to engage the respective ends of said assemblage in the outer peripheral regions of said discs to exert clamping pressure on said inner ends of said buffing fingers, said discs and clamping means having apertures therethrough adapted to admit ventilating air internally of said assemblage for radially outward escape between said buffing fingers.

17. A rotary buffing element comprising a disc adapted to be mounted on an arbor or the like, two radially spaced rows of circumferentially arranged teeth on said disc adjacent the outer periphery of the latter, a sheet material annulus fitting between said two rows of teeth and embraced and clamped thereby, a strip of sheet material interposed and firmly held between said disc and annulus, and a plurality of tapering sheet material buffing fingers secured at their narrow ends to said strip and extending radially outwardly from said disc.

18. A rotary buffing element comprising a generally flat disc shaped web member adapted to be mounted on an arbor or the like, and a plurality of narrow triangular tapering sheet material buffing fingers secured at their narrow ends in circumferentially spaced relationship on said web member and extending generally radially therefrom, with the wider outer ends of adjacent fingers of the same circumferential series overlapping and the narrower inner end portions thereof circumferentially spaced to provide ventilating passages therebetween generally parallel to the axis of rotation of such arbor, said web member having at least one eccentric opening therethrough for the passage of air therethrough and then radially outwardly between said circumferentially spaced inner end portions of said buffing fingers and along said ventilating passages.

19. A rotary buffing tool comprising supporting means adapted to be mounted on an arbor or the like, ventilating passages within said supporting means adapted for travel of air in a direction generally parallel to the axis thereof, a plurality of tapering sheet material buffing fingers secured at their narrow ends on said supporting means and extending generally radially therefrom, with the wider outer ends of adjacent fingers of the same circumferential series overlapping and the narrower inner end portions thereof circumferentially spaced apart to provide ventilating passages therebetween generally parallel to the axis of said tool, and generally radially extending passages connecting said passages within said supporting means with said passages between the inner end portions of said fingers externally of said supporting means for flow of air through said ventilating passages within said supporting means outwardly through said radially extending passages and then through said passages between the spaced inner ends of said buffing fingers.

20. A rotary buffing tool comprising an annular sheet metal stamping adapted to be mounted on an arbor or the like having a plurality of circumferentially spaced radial grooves about its periphery, sets of clamping tabs struck up intermediate such grooves and bent on generally radial lines, and inwardly tapering radially extending buffing fingers having their narrow inner end portions laterally engaging the region of said stamping from which said tabs are struck up and clamped thereagainst by said tabs, said fingers being additionally secured by adhesive applied to said clamped inner end portions.

21. A rotary buffing tool comprising an annular sheet metal stamping adapted to be mounted on an arbor or the like having a plurality of circumferentially spaced radial grooves about its periphery, sets of clamping tabs struck up intermediate such grooves and bent on generally radial lines, and inwardly tapering radially extending buffing fingers having their narrow inner end portions laterally engaging the region of said stamping from which said tabs are struck up and clamped thereagainst by said tabs.

22. A rotary tool comprising a disc shaped hub member having sets of clamping tabs extending therefrom and bent on generally radial lines, and inwardly tapering radially extending buffing fingers having their narrow inner end portions engaging the side of said disc and clamped thereagainst by said tabs.

23. A rotary buffing tool comprising two annular sheet metal stampings joined face to face to provide a unit having buffing fingers extending radially therefrom, each said stamping having an inner annular hub portion adapted to be seated on an arbor or the like, an outer peripheral laterally offset radially extending flange, and an intermediate flat web portion connecting said hub and offset portions; a plurality of circumferentially spaced radial grooves in said flange, sets of clamping tabs struck up intermediate said grooves and bent on generally radial lines, and inwardly tapering radially extending buffing fingers having their narrow inner end portions engaging the region of said flange from which said tabs are struck up and clamped thereagainst by said tabs, said fingers being additionally secured by adhesive applied to said clamped inner end portions; said web portions of said stampings having ventilating apertures therein, certain of such apertures having raised rims entering opposed apertures in the other said stamping with the respective web portions thereof directly opposed, said rims being upset to secure said stampings together with said offset portions projecting in opposite directions to form a peripheral channel containing the inner end portions of said buffing fingers, each said peripheral flange being progressively further offset in opposite directions at diametrically opposite points and said two stampings being relatively indexed to complement each other as thus joined; diametrically opposite keyways in the resultant composite hub, and indented and protruding dimples in the respective sides of said composite hub to assist proper indexing of adjacent units.

24. A rotary buffing tool comprising two annular sheet metal stampings joined face to face to provide a unit having buffing fingers extending radially therefrom, each said stamping having an inner annular hub portion adapted to be seated on an arbor or the like, an outer peripheral laterally offset radially extending flange, and an intermediate flat web portion connecting said hub and offset portions; sets of clamping tabs struck up from said flange and bent on generally radial lines, and inwardly tapering radially extending buffing fingers having their narrow inner end portions engaging the region of said flange from which said tabs are struck up and clamped thereagainst by said tabs; said web portions of said stampings being directly opposed and joined together with aligned ventilating apertures therein, said offset portions projecting in opposite directions to form a peripheral channel containing the inner end portions of said buffing fingers, each said peripheral flange being progressively further offset in opposite directions at diametrically opposite points and said two stampings being relatively indexed to complement each other as thus joined.

25. A rotary buffing tool comprising two annular disc shaped members joined face to face to provide a unit having buffing fingers extending radially therefrom, each said member having sets of clamping tabs extending therefrom adjacent the periphery of the same and bent on generally radial lines, and inwardly tapering radially extending buffing fingers having their narrow inner end portions engaging the side of said disc and clamped thereagainst by said tabs; said buffing fingers of each said disc shaped member being opposed to those of the other said member but circumferentially staggered relative thereto; and the outer peripheral portions of each of said disc shaped members being progressively axially offset in opposite directions at diametrically opposite points with said members being indexed to complement each other as joined.

26. A rotary buffing tool comprising two annular disc shaped members joined face to face to provide a unit having buffing fingers extending radially therefrom, each said member having sets of clamping tabs extending therefrom adjacent the periphery of the same and bent on generally radial lines, and inwardly tapering radially extending buffing fingers having their narrow inner end portions engaging the side of said disc and clamped thereagainst by said tabs; said buffing fingers of each said disc shaped member being opposed to those of the other said member but circumferentially staggered relative thereto.

27. A rotary buffing element comprising a disc having a central hub portion and a peripheral flange portion, and buffing fingers secured to said flange portion and extending radially outwardly therefrom, said flange portion being progressively axially offset in opposite directions at diametrically opposite points relative to the radially inner portion of said disc, thereby to prevent successive fingers from following identical circumferential paths when said disc is rotated about its axis.

28. A rotary tool comprising a generally disc shaped rotatable hub member, flat-sided tapering fabric fingers having their narrow end portions engaging the side of said disc adjacent the outer periphery thereof and their wide end portions extending radially outwardly therefrom to form the working face of the tool, finger-securing means on the side of said disc which contacts said finger end portions comprising circumferentially arranged local regions effective independently to grip the opposed lateral surfaces of said fingers superficially only, and cooperating clamping means firmly pressing said fingers against such gripping regions of such side of said disc.

29. A rotary tool comprising an annular rotatable hub having a plurality of separate radially extending outwardly flaring recesses formed laterally in its outer peripheral region, tapering working fingers having their narrow end portions inserted and secured in such recesses conforming to the flaring sides thereof and their wide end portions extending radially therefrom to form the working face of the tool, said hub having teeth engaging said fingers in such recesses.

30. A rotary tool comprising an annular sheet metal hub having a plurality of radially extending circumferentially spaced separate recesses laterally deformed in the outer peripheral portion thereof, such recesses having outwardly flaring sides, and brushing material seated and secured in such recesses and extending radially outwardly therefrom.

31. A rotary buffing tool comprising two co-axial disc shaped hub members, each said member having a plurality of separate individual buffing fingers secured to one side face and extending radially outwardly therefrom, and said discs being secured closely together with their side faces bearing said fingers toward each other, the fingers of one said disc being circumferentially staggered relative to the fingers of the other said disc.

32. A rotary buffing tool comprising two co-axial disc shaped hub members, each said member having a plurality of separate individual buffing fingers secured to one side face and extending radially outwardly therefrom, and said discs being secured closely together with their side faces bearing said fingers toward each other.

33. A rotary tool comprising an annular sheet metal hub, separate radial recesses laterally deformed in the outer peripheral portion thereof having outwardly flaring sides, and tufts of brushing material seated and secured in said recesses and extending radially therefrom, said hub being further deformed slightly so that circumferentially successive recesses do not lie in exactly the same plane.

References Cited in the file of this patent

UNITED STATES PATENTS

| | | |
|---|---|---|
| 260,558 | Fowler | July 4, 1882 |
| 872,966 | Painter | Dec. 31, 1907 |
| 1,753,201 | Edlich | Apr. 8, 1930 |
| 2,056,716 | Doyle | Oct. 6, 1936 |
| 2,168,871 | Hague | Aug. 8, 1939 |
| 2,290,236 | Hall | July 21, 1942 |
| 2,328,998 | Radford | Sept. 7, 1943 |
| 2,462,741 | Hall | Feb. 22, 1949 |
| 2,522,093 | Churchill | Sept. 12, 1950 |
| 2,553,793 | Stafford | May 22, 1951 |
| 2,602,274 | Lawler | July 8, 1952 |
| 2,609,642 | Peterson | Sept. 9, 1952 |

FOREIGN PATENTS

| | | |
|---|---|---|
| 196,084 | Great Britain | Apr. 16, 1923 |